United States Patent [19]

Misiura et al.

[11] 4,051,298

[45] Sept. 27, 1977

[54] STRIPPABLE COMPOSITE OF POLYMERIC MATERIALS FOR USE IN INSULATED ELECTRICAL CONDUCTORS, A METHOD OF FORMING THE SAME AND PRODUCTS THEREOF

[75] Inventors: Thaddeus Dominick Misiura, Sandy Hook; Joseph Edward Vostovich, Bridgeport; Ralph Edward Wahl, Trumbull, all of Conn.

[73] Assignee: General Electric Company, Bridgeport, Conn.

[21] Appl. No.: 608,447

[22] Filed: Aug. 28, 1975

Related U.S. Application Data

[62] Division of Ser. No. 468,397, May 9, 1974, Pat. No. 3,925,597.

[51] Int. Cl.$^2$ .............................................. B32B 27/00
[52] U.S. Cl. .................................. 428/383; 428/202; 428/461; 428/463; 428/343; 428/515; 428/516; 428/517; 428/518; 427/118; 427/119; 427/120; 427/409; 156/51; 156/158; 156/184; 174/120 SC; 174/102 SC; 174/126 CP; 260/42.36; 260/827; 260/878 R
[58] Field of Search ............... 428/383, 518, 202, 515, 428/516, 517; 427/118–120; 260/42.36; 156/51; 174/120 SC, 102 SC

[56] References Cited

U.S. PATENT DOCUMENTS

| | | | |
|---|---|---|---|
| 2,635,975 | 4/1953 | Peters | 428/516 X |
| 2,888,424 | 5/1959 | Precopio et al. | 260/42.36 X |
| 2,897,100 | 7/1959 | Grencey et al. | 428/516 X |
| 3,079,370 | 2/1963 | Precopio et al. | 260/94.9 |
| 3,551,284 | 12/1970 | Portolani et al. | 428/516 X |
| 3,592,728 | 7/1971 | Muise | 428/383 X |
| 3,793,476 | 2/1974 | Misiura et al. | 174/102 SC |
| 3,840,694 | 10/1974 | Luczak | 428/383 X |

FOREIGN PATENT DOCUMENTS

| | | | |
|---|---|---|---|
| 15,467 | 7/1969 | Japan | 174/84 R |

*Primary Examiner*—P. C. Ives
*Attorney, Agent, or Firm*—R. G. Simkins; P. L. Schlamp; F. L. Neuhauser

[57] ABSTRACT

A composite of polymeric materials which are adheringly joined to each other and which can be easily and cleanly separated by stripping apart with a low pulling force whereupon the contacting surfaces of their interface separate cleanly without retention of any residue on one from the other, and which comprises the combination of a previously cured body of a copolymer of ethylene and propylene adjoined to a subsequently cured body of an elastomeric blend of a copolymer of ethylene and propylene admixed with chlorosulfonated polyethylene. The combination of materials is especially advantageous when used in electrically conducting wire and cable constructions as a composite of an electrical insulation and an overlying strippable semiconductive layer.

7 Claims, 2 Drawing Figures

STRIPPABLE COMPOSITE OF POLYMERIC MATERIALS FOR USE IN INSULATED ELECTRICAL CONDUCTORS, A METHOD OF FORMING THE SAME AND PRODUCTS THEREOF

This is a division, of application Ser. No. 468,397, filed May 9, 1974, now U.S. Pat. No. 3,925,597, issued Dec. 9, 1975.

BACKGROUND OF THE INVENTION

A common type of construction for electrical wires or cables designed for medium-to-high voltage applications, for example about 15 to 69 KV, as well as other classes of electrical service, comprises combinations of one or more insulating layers and semiconductive layers. In a typical cable structure, for instance, the metallic conductor may be provided with an organic polymeric insulation such as a crosslinked polymer comprising ethylene, and an overlying body of semiconducting material comprising an organic polymeric material which has been rendered electroconductive by the inclusion therein of electrical conductivity imparting agents or fillers such as carbon black. Although these cable constructions may vary in certain elements, and often include intermediate components disposed between the metallic conductor and the primary body of dielectric insulation, such as a layer of separating tape and/or inner layer of semiconductive material, or the overall cable assembly is enclosed within a covering sheath, all such cable constructions conventionally include therein at least a body of primary dielectric insulation surrounding the conductor and an overlying body of semiconducting material in physical contact with the insulation. However, this arrangement of a layer of insulation with a superimposed layer of semiconductive material thereover incurs certain handicaps.

For example, to prevent the occurrence of ionization or corona formation resulting from internal voids or pockets within the cable construction and consequent ultimate breakdown of the insulation, it is necessary to eliminate the presence or possible occurrence of any free space or voids within or resulting from the interface between the adjoining surfaces of the body of the insulation and the body of semiconducting material. U.S. Pat. Nos. 3,541,228 and 3,677,849 deal with this problem of intermediate void spaces at the interface of the insulation and semiconductive material by applying a heat treatment to the assembled product to induce a shrinkage of the semiconductive materials tightly about the insulation. U.S. Pat. No. 3,259,688 proposes a different solution to this problem comprising a distinctive construction and an irradiation treatment.

Further, the insulation layer and overlying semiconductive layer for electrical cable can be formed concurrently about the wire or metal conductor by means of a continuous simultaneous extrusion process with one extruder, such as shown in U.S. Pat. No. 3,646,248, or these layers can be formed in sequence employing tandem extruders such as shown in U.S. Pat. No. 3,569,610, and both layers are thereafter cured at the same time in a single operation and unit to minimize manufacturing steps and apparatus. However, the simultaneous curing of both layers together, or even the curing of only one layer along while it is in a contiguous arrangement with the other layer, can result in the apparent formation of crosslinking bonds bridging across the interface between the adjoining surfaces of each phase as noted in U.S. Pat. Nos. 3,569,610 and 3,792,192. This occurrence of such crosslinking bonds bridging the interface between the surfaces of the phases can render their subsequent separation very difficult, such as during removal of a portion of the body of semiconductive material from about the insulation by stripping for the purpose of making splices or terminal connections.

The separation of these layers often requires the application of great force, and, upon being stripped or peeled off, the semiconductive material often is prone to leave a substantial residue of its mass firmly adhering to the other surface or the insulation. As is known in the art, it is necessary when splicing and treating cable ends that the semiconductive material be cleanly stripped or completely removed from the terminal section of the cable end without any damage or material loss to the underlying surface of the insulation, and consequently the separation of these phases can require an appreciable amount of added labor time and costs when the semiconductive material is difficult to remove by stripping and/or a residue thereof is retained tenaciously adhering to the surface of the insulation. A solution to the difficulties of this aspect of such cable constructions is the subject of U.S. Pat. No. 3,684,821.

Other recent U.S. Pats. addressed to the foregoing problem comprise the following: Nos. 3,643,004 relates to a cable construction wherein the semiconducting layer is adhering but unbonded to the insulating layer; No. 3,787,255 which teaches attaching sulfonate groups to the surface of the polyolefin insulation to deter migration of the curing agent from the semiconductive layer across the interface to the insulation and as a result thereof their tenacious interlocking; and 3,793,476 which proposes a semiconductive composition comprising a novel blend of ethylene-propylene rubber and chlorine-containing polymers which forms a controlled bonding upon curing with the underlying insulation of ethylene-containing polymer.

SUMMARY OF THE INVENTION

This invention comprises a combination of specific organic polymeric materials coupled with a curing sequence whereby an elastomeric blend, which may comprise a body of semiconductive material, can be adheringly united to a contacting surface of a body of a copolymer of ethylene and propylene having an ethylene content of not more than about 50% by weight of the copolymer, a conventional material for dielectric insulations. The materials and curing sequence of this invention provide a substantially continuous and secure union of their contacting surfaces extending over their common interface and thereby effectively obviation the occurrence of intermediate void spaces, while at the same time providing an interface union between the phases which is easily separated with a relatively small pulling force whereupon the components part from each other with clean surfaces each free of any residue from the other.

The invention includes the combination of a first body of a copolymer of ethylene and propylene of approximately equal parts by weight of copolymerized ethylene and propylene, adheringly joined with a second body composed of an elastomeric blend of a minor portion of ethylene-propylene rubber admixed with a major portion of chlorosulfonated polyethylene, wherein said second body of an elastomeric blend is in an uncured condition and is applied to the first body of the copolymer in a cured while a surface thereof is physical contact with a surface of the cured first body of copolymer.

The compositions and their attributes of this combination are uniquely suitable and advantageous for use in the construction of electrical wires and cables in the function of a composite of an insulation of ethylene-propylene copolymer or terpolymer with an easily and cleanly strippable semiconductive material superimposed over the insulation when the polymeric material comprising the elastomeric blend is rendered suitably electroconductive by appropriate filling with a typical electrical-conductivity-imparting agent or filler such as carbon black dispersed therethrough, or some other electrically conductive particulate material such as silicon carbide, iron, aluminum, and the like, in such amounts so as to impart the desired degree of conductivity.

OBJECTS OF THE INVENTION

It is a primary object of this invention to provide polymeric materials that can be joined in a contiguous relationship with their interfacial surfaces adheringly united together so as to eliminate the presence or any occurrence of intermediate void spaces therebetween, and which thereafter can be separated by the application of a low pulling force with the interfacial surfaces of the bodies cleaving cleanly and free of any adhering residual material.

It is also a primary object of this invention to provide electrical conductors or wire, and a method of manufacturing same, with coverings including a combination of bodies of organic polymeric materials comprising a first layer of insulation with a surface thereof adheringly joined to a surface of a second layer which may be of any suitable thickness down to less than about one millimeter, and wherein the second layer of the polymeric material is easily and cleanly strippable from the first layer of insulation with a low peeling effort of preferably about 2 to 18 pounds pulling force per one half inch wide strip of material, leaving the spearated surface of each layer intact, and clean and free of any residue.

It is an additional and specific object of this invention to provide an electrical wire or cable, and method of manufacturing same, having a multilayered covering about a metallic conductor comprising a combination of cured polymeric materials consisting of an insulation and an overlying semiconductive shield which is free of intermediate voids or spaces at the interface of said materials, and wherein the material consisting of the semiconductive shield comprises a polymeric carrier or matrix for particulate conductive filler material dispersed therethrough can be peelded or stripped off the underlying insulation with little effort or pulling force and it separates or parts cleanly from the surface of the insulation leaving it intact and without adhering material.

It is a further object of this invention to provide a method of joining polymeric materials in a contiguous relationship with their interfacial surfaces adheringly united so as to eliminate the presence or occurrence of intermeidate void spaces therebetween, and which thereafter can be separated by the application of a low pulling force with the interfacial surfaces of the bodies cleaving cleanly and free of any adhering residual material.

DESCRIPTION OF A PREFERRED EMBODIMENT

Figure 1:
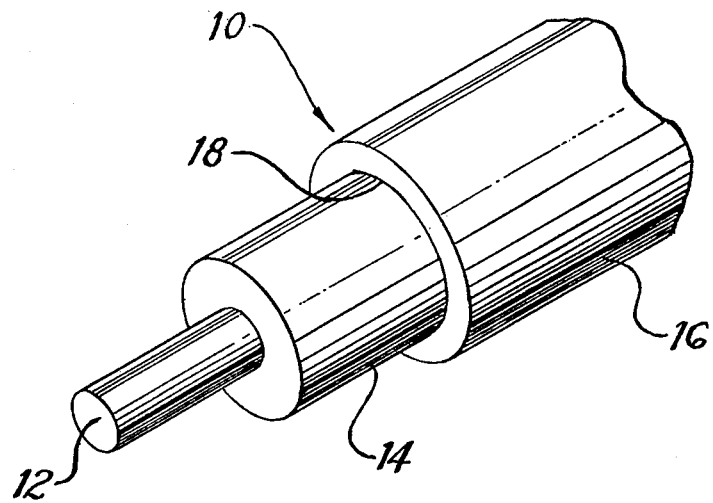
FIG. 1 comprises a perspective view of a portion of an insulated conductor having a semiconductive shield thereon; and, FIG. 2 comprises a cross-sectional view of the insulation and overlying semi-conductive layer about a portion of metallic conductor.

This invention is hereinafter described in relation to its principal field of application and utility, the construction of electrical wire and cable, although other areas of application are contemplated.

The invention specifically consists of a novel combination of given polymeric materials, or combined bodies composed thereof, coupled with a sequence of curing and combining such polymeric materials, for adheringly joining them together with unique interfacial characteristics at their mutual contiguous surfaces.

Polymeric materials of the invention comprise for the one phase, a body or unit of a copolymer or terpolymer of ethylene and propylene having an ethylene content of not more than about 50% by weight of the polymerized material, and preferably copolymers comprising approximately equal parts by weight of ethylene and propylene, and for the other phase or unit an elastomeric blend of about 20 to about 40 parts by weight of a copolymer or terpolymer of ethylene and propylene admixed with about 60 to about 80 parts by weight of chlorosulfonated polyethylene. Accordingly for the purposes of this disclosure and the claims, the term copolymers of ethylene and propylene includes terpolymers comprising such monomers.

The terpolymers of ethylene-propylene suitable for this invention include commercially available rubbers produced by the copolymerization of ethylene and propylene together with minor proportions of dienes such as ethylidiene nonbornene, dicyclopentadiene or 1,4-hexadiene or combinations thereof. The terpolymers of ethylene-propylene with dienes, as is well known in the art, give greater latitude in the available curing systems in relation to the copolymers of only ethylene and propylene. Specifically, the copolymers require a free radical curing mechanism as provided by a peroxide compound, whereas the unsaturated phase of the terpolymers enables curing with a conventional sulfur-accelerator curing system, as well as with a peroxide free radical system.

An essential aspect of this invention comprises the curing, by conventional means such as curing agents, of the first phase or body of the copolymer of ethylene and propylene prior to the physical combining or joining together of the first and second phases or bodies, and the curing, by conventional means such as curing agents, of the second phase or body of the elastomer blend while in physical contact with the previously cured first phase or body. Thus the curing and adjoining sequence required to achieve the advantages and benefits of the invention, comprises applying the body or mass of the elastomeric blend while in an uncured condition to the body or mass of the copolymer of ethylene and propylene in a cured condition, and thereafter curing the body or mass of elastomeric blend while a surface thereof is in adjoining physical contact with a surface of the cured copolymer of ethylene and propylene. This sequence of curing and adjoining the respective polymeric components is necessary to prevent formation of a tenacious union and bonding between the interface of the polymeric components which can only be separated with the application of very high pulling forces, and does not separate cleanly with each unit free of residue of the other.

The organic polymeric materials of each phase of the combination of this invention, both the copolymer of ethylene and propylene and the elastomeric blend, are typically cured to a substantially thermoset condition by crosslinking with a free radical forming peroxide according to conventional practices such as described in U.S. Pat. Nos. 2,888,424 and 3,079,370, and in subsequent relevant prior art. However, other curing systems or means known to the art or prescribed by the polymer manufacturers or suppliers can be applied, such as the use of sulfur-based systems with terpolymers comprising ethylene and propylene.

For service in electrical applications such as a semiconductive component in cable for medium to high voltage service, the elastomeric blends can be easily rendered electroconductive to any appropriate degree desired by the filling or inclusion therethroughout of a suitable amount of an electrical conductivity imparting agent such as about 15 to about 75 parts of carbon black or metal particles by weight of the polymeric ingredients according to conventional practices. When aptly rendered electroconductive with a suitable amount of a conductive material, dispersed therethroughout, the elastomeric blend can fulfill the required electrical functions of a semiconducting material in electrical cable, and when combined with an ethylene-propylene copolymer insulation and cured in accordance with the sequence of this invention, the combination provides the unique interfacial properties which effectively eliminate the occurrence of intermediate void spaces between the interface surfaces of insulation and semiconductive material and also enables an easy and clean separation of the semiconductive material from the insulation.

Figure 2:
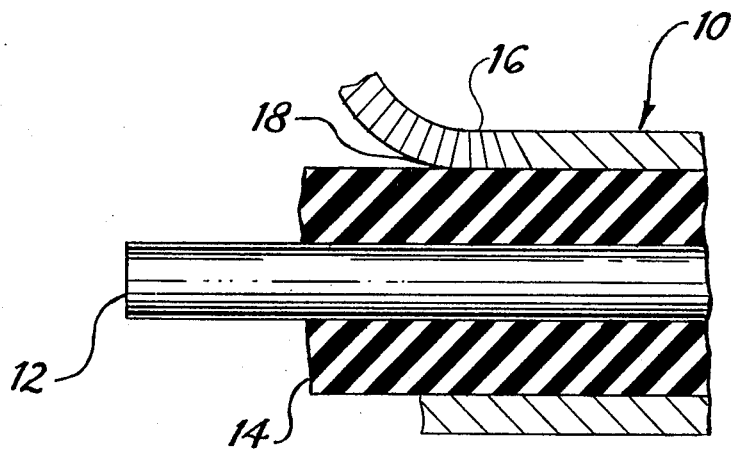

Referring to the drawing, a typical cable of medium-to-high voltage capacity of the type to which this invention is especially applicable and advantageous, is shown in perspective in FIG. 1, and a short portion of such a cable is also shown with the insulation and semiconductive layer in longitudinal cross section about the conductor in FIG. 2. The overall cable product 10, primarily comprises a metallic conductor 12, a relatively thick first body of dielectric insulation 14 surrounding the conductor, and overlying the insulation is a second body or layer of semiconductive material 16. Other components can be included in the cable structure following known designs. For example, separating paper or tape can be provided on the conductor or a semiconductive layer can be located between the metallic conductor 12 and the primary insulation 14, such as shown in the aforementioned U.S. Pat. Nos. 3,259,688 and 3,684,821, and the means of this invention apply thereto with its attendant advantages whenever the insulation abuts the semiconductive component as is conventional in medium-to-high voltage capacity cables. Upon combining and curing the components in the essential sequence of this invention as set forth hereinabove, the insulation and semiconductive material covering the insulation become adheringly joined to each other, producing a united interface 18 of unique attributes which eliminates intermediate voids, and upon the application of a small pulling force of only a few pounds, the surfaces at the interface separate cleanly leaving each surface free of adherents from the other.

The following comprise specific examples of suitable and preferred polymeric materials for the application of this invention in the construction of high-voltage cable comprising a body of ethylene-propylene copolymer insulation combined with an overlying body of semiconductive material of a polymeric carrier or matrix comprising an elastomeric blend filled with particulate conductive material.

INSULATING COMPOSITION

The ethylene-propylene copolymer insulating composition of the following examples consisted of the following ingredients, in parts by weight:

|  | Parts By Weight |
|---|---|
| Ethylene-Propylene Copolymer (50% wt. ethylene) Vistalon 404, Exxon Chemical Co. | 100.0 |
| Antioxidant - Flectol H, Monsanto polytrimethyldihydroquinoline | 2.0 |
| Zinc Oxide | 3.0 |
| Lead Dioxide | 2.0 |
| Polybutadiene homopolymer - Ricon 150 | 5.0 |
| Clay | 96.0 |
| Petrolatum | 5.0 |
| Vinyl Silane | 1.5 |
| Dicumyl Peroxide Curing Agent Di Cup 40 KE, Hercules | 6.0 |

These ingredients of the dielectric insulation were compounded in a suitable mixer, a Banbury mixer, until substantially homogeneously dispersed. However, pursuant to conventional practices, all ingredients except the peroxide curing agent were first admixed with the temperature of the mixing ingredients maintained below about 400° F. To prevent precuring the peroxide curing agent was added to the admixed ingredients while at a temperature of below about 200° F. The compound was then ready for forming to a given shape and curing to a thermoset condition by the application of heat.

SEMICONDUCTIVE COMPOSITION

The elastomeric blend semiconductive composition of the following examples consisted of the following ingredients, including an electrically conductive carbon black, in parts by weight:

|  | Parts By Weight |
|---|---|
| Chlorosulfonated Polyethylene Hypalon 40S, duPont | 65.0 |
| Ethylene-Propylene Terpolymer Nordel 1320, duPont | 35.0 |
| Conducting Carbon Black Vulcan XC-72 | 45.0 |
| Litharge (90% in EPDM) | 20.0 |
| Naphthenic Oil Circosol 4240 Oil | 17.0 |
| Crystalline Hydrocarbon Wax Sunoco Anti-Chek | 2.0 |
| Antioxidant - Agerite Resin D, R. T. Vanderbuilt Polymerized dihydrotrimethylquinoline | 0.5 |
| Trimethyl Propane Trimethacrylate SR-350 | 2.0 |
| Dicumyl Peroxide Curing Agent Di Cup R, Hercules | 2.5 |

The foregoing ingredients of the semiconductive composition were also compounded in a Banbury mixer until substantially homogeneously dispersed. Also according to conventional practice, all ingredients except the peroxide curing agent were first admixed with the temperature of the mixing ingredients maintained below about 250° F. To prevent precuring the peroxide curing agent was added to the admixed ingredients while at a temperature of below about 200° F. The compounded elastomeric blend was then ready for forming to shape and curing to a thermoset condition by activating the curing agent with heat.

Samples of both of the foregoing insulating and semiconducting compounds were sheeted out on separate roll mills and applied as follows. In the hereinafter described Example I, strip specimens of each sheeted sample of uncured insulation and uncured semiconducting material were combined by superimposing specimens of one sample sheet upon the other and both cured together as a laminate in adjoining physical contact in a press at 310° F for 45 minutes. After cooling to room temperature and conditioning for at least 16 hours at room temperature, ½ by 4 inch strips of the simultaneously cured laminated samples were tested for strippability. The results are given hereinafter.

Like samples of both of the same foregoing insulating and semiconducting compounds sheeted out on separate mill rolls were applied as follows in accordance with this invention for comparison. In Example II, the strip specimens of the sheeted insulating composition of ethylene-propylene copolymer were first cured at 350° F for 15 minutes in a mold. After cooling to room temperature and conditioning for at least 16 hours at room temperature, the precured strip specimens of the insulating compound were combined with like sheeted specimens of the uncured semiconducting compound by superimposing one sheeted specimen on the other providing a laminate. The semiconductive compound was thereafter cured as a laminate while in adjoining physical contact with the precured insulating compound, at 310° F for 45 minutes in a press.

After cooling to room temperature, ½ by 4 inch strips of the dissimilarly cured specimens of Example II were tested for strippability in the same manner and conditions as the simultaneously cured specimens of Example I. The combined results were as follows:

| Example I | Example II |
|---|---|
| Specimens could not be stripped apart, semicon layer completely bonded to insulation. | Specimens stripped with average pulling force of 2.32 lbs., and separated cleanly. |

In the following examples illustrating the merits of this invention, the foregoing insulating and semiconducting compositions were combined under actual extrusion conditions simulating the manufacture of high-voltage electrical cable having a metallic conductor covered with a body or layer of dielectric insulation and an overlying body or layer of semiconducting material. The cable construction consisted of a #2 AWG stranded metal core conductor, covered with a 0.150 inch thickness of the insulation and a 0.035 inch thickness of the semicon with a total outside diameter of about 0.680 inches, each applied by extrusion in a conventional manner.

In each example, the insulating composition was continuously formed on the core conductor by a first extrusion operation and thereafter continuously cured by passing at a rate of 14 feet per minute through a steam chamber 75 feet in length maintained at a pressure of about 255 psig (209° C) for a dwell period of about 5 minutes.

Following the continuous forming and curing of the insulation composition on the core conductor, an overlying covering of the semiconducting composition was continuously applied in each example by a second extrusion operation and thereafter continuously cured by passing at a rate of 15 feet per minute through a steam chamber 75 feet in length maintained at a pressure of about 255 psig (209° C) for a dwell period of about five minutes.

The four examples prepared as described according to this invention were treated and tested for several properties in addition to strippability as set forth in the following table.

| Insulation Treatment Prior To Semicon Extrusion | EXAMPLES | | | | Requirements* |
|---|---|---|---|---|---|
|  | III | IV | V | VI |  |
| Insulation Ovenized** | No | No | Yes | Yes |  |
| Spica oil applied to interface*** | Yes | No | No | Yes |  |
| PROPERTIES |  |  |  |  |  |
| Outer Semicon Results |  |  |  |  |  |
| Tensile Strength, psi | 1622 | 1615 | 1915 | 1858 |  |
| Elongation, % | 305 | 327 | 295 | 302 |  |
| Seven Days Air Oven 121° C |  |  |  |  |  |
| Tensile Strength, psi | — | 1681 | 1626 | 1802 |  |
| Elongation, % | — | 223 | 205 | 193 | 100 minimum |
| Conductivity |  |  |  |  |  |
| Room Temperature - ohm-cm | — | 525 | 108 | 103 | 5000 maximum |
| 90° C - ohm-cm | — | 243 | 70 | 55 | 50000 maximum |
| Strippability |  |  |  |  |  |
| Lbs. per ½ inch wide strip | 4.75 | 5.75 | 5.38 | 5.64 | 4 - minimum<br>18 - maximum |

*IPCEA S- 66-524 & AEIC 6-73
**Ovenizing conditions - 51 hrs. at 115° C
***Spica oil applied to insulation surface prior to semicon extrusion to prevent nipple "plug-up".

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. An easily and cleanly strippable composite of cured polymeric materials comprising a body of a copolymer of ethylene and propylene having an ethylene content of not more than about 50% by weight with a surface adheringly joined to a contacting surface of a body comprising an elastomeric blend of about 20 to about 40 parts by weight of a copolymer of ethylene and propylene admixed with about 60 to about 80 parts by weight of chlorosulfonated polyethylene, said contacting surfaces of the bodies of polymeric materials being adheringly joined at their contacting surfaces by applying the body of the elastomeric blend while in an uncured condition to the body of the copolymer of ethylene and propylene in a cured condition and thereafter curing said body of the elastomer blend while a surface thereof is in adjoining physical contact with a surface of the cured body of the copolymer of ethylene and propylene.

2. The easily and cleanly strippable composite of cured polymeric materials of claim 1, wherein said elastomeric blend comprises about 35 parts by weight of copolymer of ethylene and propylene admixed with about 65 parts by weight of chlorosulfonated polyethylene.

3. The easily and cleanly strippable composite of cured polymeric materials of claim 1, wherein said polymeric material of the body of a copolymer of ethylene and propylene comprising approximately equal parts by weight of copolymerized ethylene and propylene.

4. An easily and cleanly strippable composite of cured polymeric materials comprising a body of a copolymer of ethylene and propylene in approximately equal parts by weight with a surface adheringly joined to a contacting surface of a body comprising an elastomeric blend of about 20 to about 40 parts by weight of a copolymer of ethylene and propylene admixed with about 60 to about 80 parts by weight of chlorosulfonated polyethylene, said contacting surfaces of the bodies of polymeric materials being adheringly joined by applying the body of the elastomeric blend while in an uncured condition to the body of the copolymer of ethylene and propylene in a cured condition and thereafter curing said body of the elastomeric blend while a surface thereof is in adjoining physical contact with a surface of the cured body of the copolymer of ethylene and propylene.

5. A method of preparing an easily and cleanly strippable composite or cured polymeric materials comprising a body of a copolymer of ethylene and propylene having an ethylene content of not more than about 50% by weight with a surface adhereingly joined to a contacting surface of a body comprising an elastomeric blend of about 20 to about 40 parts by weight of a copolymer of ethylene and propylene admixed with about 60 to about 80 parts by weight of chlorosulfonated polyethylene, comprising curing a body of said copolymer of ethylene and propylene, applying to a surface of said cured body of copolymer of ethylene and propylene a body comprising said elastomeric blend in an uncured condition, and while the surfaces of said bodies of cured and uncured polymeric materials are in adjoining physical contact, curing said body of uncured elastomeric blend.

6. The method of preparing an easily and cleanly strippable composite of cured polymeric materials of claim 5, wherein said elastomeric blend comprises about 35 parts by weight of copolymer of ethylene and propylene admixed with about 65 parts by weight of chlorosulfonated polyethylene.

7. The method of preparing an easily and cleanly strippable composite of cured polymeric materials of claim 5, wherein the polymeric material of the body of a copolymer of ethylene and propylene comprising approximately equal parts by weight to copolymerized ethylene and propylene.

* * * * *